United States Patent [19]
Brief et al.

[11] Patent Number: 5,333,270
[45] Date of Patent: Jul. 26, 1994

[54] FDDI CONFIGURATION MANAGEMENT STATE MACHINE CONTROLLER

[75] Inventors: David C. Brief, Palo Alto; Walter R. Friedrich, Pleasanton, both of Calif.; James F. Torgerson, Andover, Minn.

[73] Assignee: National Semiconductor Corporation, Santa Clara, Calif.

[21] Appl. No.: 998,412

[22] Filed: Dec. 29, 1992

[51] Int. Cl.5 .............................................. G06F 13/00
[52] U.S. Cl. ..................................................... 395/200
[58] Field of Search ............... 395/200, 250; 370/85.5, 370/85.4, 85.12; 340/825.05

[56] References Cited

U.S. PATENT DOCUMENTS

| | | | |
|---|---|---|---|
| 4,979,167 | 12/1990 | McCool | 370/85.4 |
| 5,161,193 | 11/1992 | Lampson et al. | 380/49 |
| 5,182,747 | 1/1993 | Frenzel, III et al. | 370/85.5 |
| 5,185,863 | 2/1993 | Hamstra et al. | 395/250 |

*Primary Examiner*—Dale M. Shaw
*Assistant Examiner*—Sang Hui Kim
*Attorney, Agent, or Firm*—Hickman & Beyer

[57] ABSTRACT

A controllable configuration management (CFM) state machine user interface is disclosed for use in the physical layer controller of a station or concentrator capable or insertion into a data transmission network that is capable of operating substantially in accordance with the FDDI protocol. In one aspect of the invention, the physical layer controller includes a null configuration register, a join configuration register and a loop configuration register. The null configuration register is capable of storing information indicative of a desired configuration of the physical layer controller when the CFM state machine is in a null configuration. Similarly, the join and loop configuration register are capable of storing information indicative of desired configurations when the CFM state machine is in the join and loop configurations respectively.

19 Claims, 7 Drawing Sheets

FDDI CONFIGURATION MANAGEMENT STATE MACHINE CONTROLLER

BACKGROUND OF THE INVENTION

1Field of the Invention

The present invention relates generally to management of the internal interconnection of the ports and media access control layers (MACS) within a node of a data transmission network that operates substantially in accordance with the FDDI protocol. More particularly, a hardware based user interface is provided that permits the user to readily control port and MAC interconnections.

2. Discussion of the Prior Art

One type of high speed data transmission network is defined by the Fiber Distributed Data Interface (FDDI) protocol. The FDDI protocol is an American National Standards Institute (ANSI) data transmission standard which applies to a 100 Mbit/second token ring network that utilizes an optical fiber transmission medium. The FDDI protocol is intended as a high performance interconnection between a number of computers as well as between the computers and their associated mass storage subsystem(s) and other peripheral equipment.

Information is transmitted on an FDDI ring in frames that consist of 5-bit characters or "symbols", each symbol representing 4 data bits. Information is typically transmitted in symbol pairs or "bytes". Tokens are used to signify the right to transmit data between stations. The FDDI standard includes a thirty-two member symbol set. Within the set, sixteen symbols are data symbols (each representing 4 bits of ordinary data) and eight are control symbols. The eight control symbols are: J (the first symbol of a start delimiter byte JK), K (the second symbol of a start delimiter byte JK), I (Idle), H (Halt), Q (Quiet), T (End Delimiter), S (Set) and R (Reset). The remaining eight symbols of the FDDI standard symbols set are not used since they violate code run length and DC balance requirements of the protocol. These are referred to as V (violation) symbols. In operation, a continuous stream of control symbol patterns defines a "line state". The FDDI protocol defines several line states that are used during the connection management sequence.

The FDDI Station Management (SMT) standard provides the necessary control of an FDDI station (node) so that the node may work cooperatively as a part of an FDDI network. To effectively implement the functions required, SMT is divided into three entities, namely the Connection Management entity (CMT), the Ring Management entity (RMT) and the Frame Based Services. The Connection Management (CMT) is the management entity in the Station Management that is responsible for the station's port(s), as well as the connection to the ports of neighboring stations.

The Connection Management is further divided into three sub-entities. They include, the Physical Connection Management (PCM), Configuration Management (CFM) and Entity Coordination Management (ECM). A general description of the Station Management standard, as well as each of its subparts, including the Connection Management (CMT), the Configuration Management (CFM) and the Physical Connection Management (PCM) is described in detail in the draft ANSI FDDI Station Management Standard, dated Jun. 25, 1992, which is incorporated herein by reference.

Although the FDDI protocol is based primarily on the concept of a dual ring wherein communications are possible between nodes in both directions (i.e. a duplex connection), some parties have proposed that the FDDI-2 standards facilitate the use of simplex connections as well. Simplex connections are intended to connect single-attachment stations. The intent of the simplex connection scheme is to permit the transmission of ring information through stations on a lobe. Within the lobe, communication would be possible in only one direction. Thus, when the lobe is in operation, all information within the ring would pass directly through each station on the lobe.

Nodes that may be used within an FDDI network generally fall into the classifications of single attachment nodes and dual attachment nodes. Dual attachment nodes have two ports to accommodate the dual trunk rings of the FDDI network. Single attachment stations have a single port and therefore cannot directly attach to the dual trunk rings. Rather, the single attachment stations typically are coupled to the trunk rings through a concentrator that forms the root of a tree. The concentrator may be single attachment or a dual attachment type. Thus, as seen in FIG. 1, a typical FDDI network may consist of a plurality of dual attachment nodes arranged in a trunk ring 210. The dual attachment nodes may include both dual attachment stations 211 and dual attachment concentrators 212. Each dual attachment concentrator 212 forms the root of a concentrator tree 215. As seen in FIG. 1, the concentrator tree may include various single attachment concentrators 217 that form the root of tree branches and single attachment stations 219. As used hereafter, the terms "node" and "station" are intended to be generic and apply to both formal FDDI stations and FDDI concentrators.

Each dual attachment node contains two Ports designated as A and B. Port A is intended to be connected to the primary ring on the incoming fiber and the secondary ring on the outgoing fiber. Similarly, Port B is intended to be connected to the incoming fiber of the secondary ring and the outgoing fiber of the primary ring. Therefore a properly formed trunk ring is composed of a set of stations with the Port A of one station being connected to the port B of the neighboring station.

Concentrator nodes contain one or more Ports of type M to provide connections within a concentrator tree. A single attachment node (whether it be a station or concentrator) has an S type Port which is intended to be attached to an M type port within a concentrator tree. Accordingly, a standard FDDI network would typically have as many as four different types of ports. That is, A, B, M, and S type ports.

The FDDI network topology may be viewed at two distinct levels. That is the physical topology and the logical topology. Physical topology describes the arrangement and interconnection of nodes with physical connections. In contrast, logical topology describes the paths by which tokens and information flow through the network between MACs. The logical and physical topologies of an FDDI network are not necessarily the same. The tree structure provided through concentrators can have the token path entering and exiting the concentrator many times on the same ring, where logically, each concentrator MAC will only appear once on a ring. That is, the token will only pass once through the concentrator's MAC. Also, the number of MACs and attachments in a station need not be equal, so a station in the trunk ring may be physically in both rings, but may be in only one of the logical rings.

Under the normal FDDI standard, all physical connections are duplex links. In a fully connected trunk ring, a duplex link supports counter-rotating rings, whereas in a tree, the duplex link provides transmit and receive paths for one of the dual rings. As seen in FIG. 1, these two connection structures can be combined to produce a dual ring that may include a variety of trees in a fully connected network. The dual ring includes a primary ring and a secondary ring. A concentrator is provided at the base of each tree. Single attachment concentrators transmit information from one of the rings down through their associated tree. The ring chosen to logically extend down a tree may be either the primary or the secondary ring. On the other hand, a dual attachment concentrator has the ability to extend both logical rings down associated trees, thereby forming two separate trees (one with the primary ring and another with the secondary ring).

The introduction of an FDDI station (node) into the data flow path of the FDDI ring is governed by the Physical Connection Management (PCM) entity. To accomplish this, the PCM initializes the connection of neighboring ports and manages the line state signalling. Therefore, the PCM provides all of the necessary signalling to initialize a connection, to withhold a connection on a marginal link and to support maintenance. In order to manage the initial connection between neighboring ports of separate stations, the PCM manages the physical layer, controls the line-states transmitted during initiation and monitors the line-states received during the connection initialization.

The connection process is achieved through a lockstep handshaking procedure. In the basic FDDI sequence, the handshaking procedure controlled by the PCM is divided into three stages. They include an initialization sequence, a signaling sequence and a join sequence. The initialization sequence is used to indicate the beginning of the PCM handshaking process. It forces the neighboring PCM into a known state so that the two PCM state machines can run in a lock-step fashion.

Following the initialization sequence is the signaling sequence. The signaling sequence communicates basic information about the port and the node with the neighboring port. A Link Confidence Test (LCT) is also conducted during the signaling sequence to test the link quality between the two ports. If the link quality is not acceptable or the type of connection is not supported or is currently not accepted by the nodes then the connection will be withheld. If the connection is not withheld during the signaling sequence, the PCM state machine can move on to the join sequence and establish a connection between the two neighboring ports.

The PCM is responsible for sending two signals to the Configuration Management (CFM) state machine. They are the CF_Join flag and the CF_Loop flag. The CF_Join flag is activated at the end of the join sequence when the node is to be inserted into the active transmission ring. Thus, it signals the CFM to establish an active connection. The CF_Loop flag is intended to provide a path to the neighboring port for extended link testing or information exchange prior to the establishment of an active connection. Thus, the CF_Loop flag is activated when the PCM desires to execute a loop test during the signalling sequence portion of the connection management sequence.

The Configuration management (CFM) is responsible for defining the interconnections of the ports and MAC(s) within a node. Thus, the CFM controls the routing of data within the node. In hardware implementations, the routing is controlled by programming a configuration switch based on the CFM control flags issued by PCM and on the overall node path configuration. The FDDI SMT standard contemplates that there are numerous internal configurations that an FDDI node must be able to support. For example, any given port may be in an isolated path configuration. In this situation, data received through an input line $P_{in}$ would be passed directly out of the port through the output line $P_{out}$ of the same port.

The usual active FDDI configuration for a dual attachment station on a trunk ring is a "thru path" arrangement wherein the network's primary data transmission path enters the A port, passes through the nodes internal primary path and emerges from the B port. At the same time the network's secondary data transmission path enters the B port, passes through the nodes internal secondary path and exits through the A port. The internal paths may require the data to physically pass through one or more MACs. Alternatively, the port may be connected in a concatenated path arrangement wherein after entering through the input line $P_{in}$ of a particular port, the data path passes through both the primary and secondary internal data paths within the node before exiting the output line $P_{out}$ of the same port. In a dual attachment station, this arrangement is particularly likely in the event of a failure in the connection between one of the local ports and its remote neighbor. The internal configurations that are permissible in accordance with the FDDI standards are set forth in detail in the above referenced SMT standard. However, it is important to note that system designers (users) may wish to implement other (non-standard) internal path configurations as well in order to facilitate a particular design requirement. Thus, it is important that the user be provided with a mechanism for implementing a wide variety of internal node path configurations.

FDDI nodes will often include two or more MACs. Typically, each MAC would appear logically at only one point in the ring. Thus, a MAC is typically a logical member of just one of the primary, secondary and local (if any) rings. The Configuration Management permits the ports to be attached to these MACs in a variety of manners. By way of example, in a dual attachment node that forms a part of the trunk ring, a main MAC might be used in the primary ring during active transmission, while the secondary MAC is used in the secondary (or backup) ring. However, in such a system, it may be desirable to use the secondary MAC to conduct the loop tests during the connection process of any port. Therefore, the Configuration Management must permit reconfiguration of the ports and MACs during the connection initiation procedures.

In another example, in the event of a failure in the primary MAC, it may be desirable to insert the second MAC into the primary ring and eliminate it from the secondary ring. Of course a wide variety of other configurations are contemplated by the FDDI station management standard as well. In other specific applications, system designers (users) may wish to provide different port to MAC configurations to suit a particular need. Indeed, in some systems it may be desirable to utilize both the primary and secondary rings for data transmission to increase the system's throughput. Therefore, it is desirable to provide a physical layer controller that permits the user to easily control the port and MAC configurations regardless of the number of ports and MACs that are provided. In order to facilitate high speed connections, it is also desirable to provide a physical layer controller that can accomplish the connection management functions with minimal software intervention.

SUMMARY OF THE INVENTION

Accordingly, it is an object of the present invention to provide a physical layer controller that incorporates the CFM into the hardware design in a manner that minimizes the need for software support during the connection management sequence and which provides a user interface that permits the user to designate the internal configuration of a particular node.

To achieve the foregoing and other objects and in accordance with the purpose of the present invention, a physical layer controller having a Configuration Management (CFM) entity therein is disclosed. The physical layer controller is adapted for controlling the physical layer of a station that is capable of insertion into a data transmission network that is capable of operating substantially in accordance with the FDDI protocol. The CFM includes a CFM state machine that is capable of operating substantially in accordance with the FDDI configuration management protocol. Accordingly, the CFM state machine is capable of automatically (re)configuring in response to CFM control flags received from PCM. The permissible configurations include Null, Join and Loop configurations. In one aspect of the invention, the physical layer controller includes a null configuration register, a join configuration register and a loop configuration register. The null configuration register is capable of storing information indicative of a desired configuration of the physical layer controller when the CFM state machine is in a null configuration. The join configuration register is capable of storing information indicative of a desired configuration when the CFM state machine is in a join configuration. The loop configuration register is capable of storing information indicative of a desired configuration when the CFM state machine is in a loop configuration.

In a preferred embodiment, the null, join, and loop configuration registers are read/write registers that may be read and written into by a user in order to set the configuration to be used when the CFM state machine enters the configuration associated with that configuration register. In another preferred embodiment, a current configuration register is also provided. The current configuration register dictates the configuration of the physical layer controller at all times. To accomplish this the current configuration receives the contents of the null, join and loop configuration registers when the CFM state machine is in the null, join and loop configurations respectively.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE INVENTION

Figure 1:
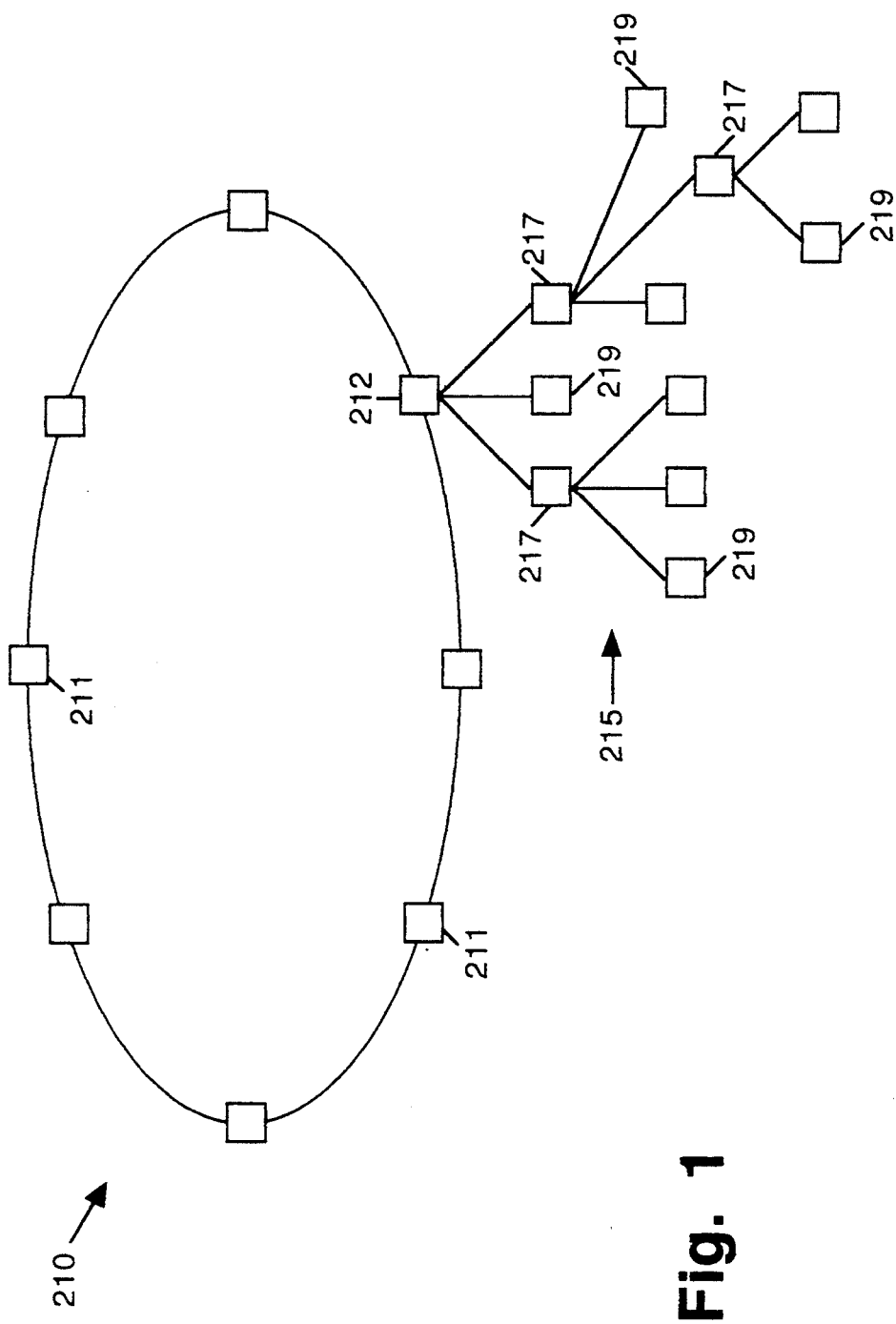
FIG. 1 is a diagrammatic representation of a FDDI network.
Figure 2:
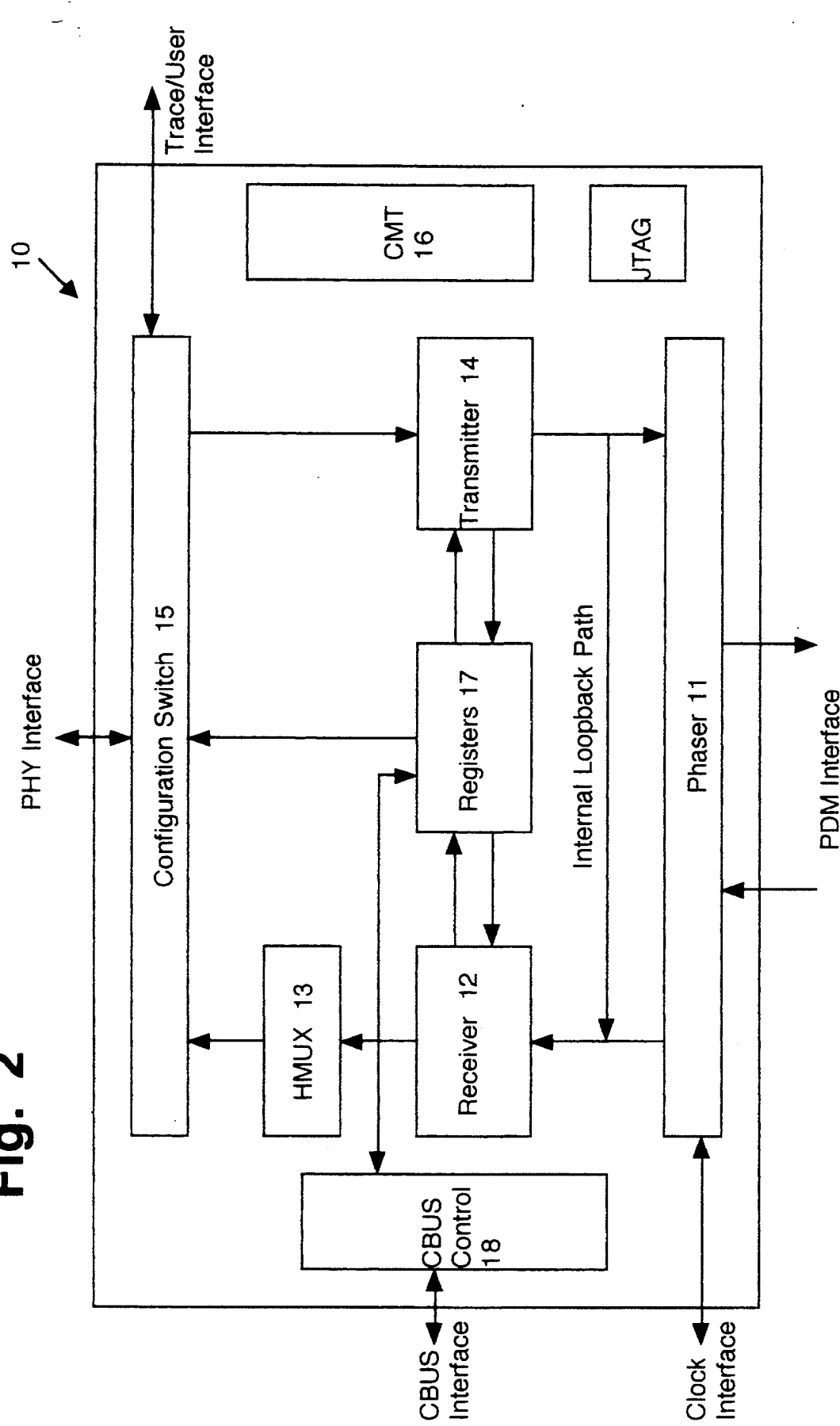
FIG. 2 is a block diagram of a Physical Layer Controller.

FIG. 2 shows a block diagram of a Physical Layer Controller (PLAYER TM) 10 which implements the Physical Layer (PHY) functions as defined by the Fiber Distributed Data Interface (FDDI) protocol (ANSI . Z3T9.5). The Physical Layer Controller 10 has several primary blocks including: a phaser 11, a receiver 12, a hybrid Multiplexor (HMUX) 13, a transmitter 14, a configuration switch 15, connection management (CMT) 16, a multiplicity of storage registers 17 and a control bus interface 18.

The phaser 11 accepts a serial binary 125 MBits/sec Non-Return-To-Zero-Invert-On-Ones (NRZI) data stream from an external source, through a serial channel that connects with the FDDI network fiber optic transmission medium. The phaser 11 establishes the 5-bit symbol boundaries for the serial bit stream and synchronizes the upstream station's clock to the local clocks of the Physical Layer Controller 10.

The receiver 12 accepts serial binary information from either the phaser 11 or from the transmitter 14 via one of two internal loopback paths. When necessary, the receiver 12 converts the information stream from the (NRZI) format utilized on the FDDI medium to Non-Return-To-Zero (NRZ) format used internally by the receiving station and decodes the NRZ data from external 5B coding to internal 4B coding. The receiver 12 also performs line state detection, link error detection and presents the data to the configuration switch 15 as internally coded symbol pairs.

The hybrid multiplexor 13 performs the functions of an HMUX as defined in the ANSI X3T9.5 Hybrid Ring Control Draft Proposed American National Standard. Therefore, the HMUX processes received cycles and determines where the information within a received cycle should be sent.

The transmitter 14 accepts information characters as symbol pairs from the internal 4B coding to the external 5B coding, filters out code violations in the information stream and redistributes Idle bytes which were added or deleted by the elasticity buffer. In addition, the transmitter 14 is capable of generating Idle, Master, Halt, Quiet or other user defined symbols. The transmitter 14 also converts the information stream from NRZ to NRZI and presents it to either the receiver 12 via one of the internal loopback paths or to the FDDI fiber optic medium as a serial bit stream.

The primary function of the configuration switch 15 is to route the information flow within the station to support multiple station configurations without requiring external logic. To accomplish this, the configuration switch controls the internal station data paths (channels) between ports and MACs. The control bus interface 18 gives the user access to the registers 17. This allows the user to program the configuration switch 15, to enable and disable functions within the receiver 12 and the transmitter 14, to report line states and link errors detected by the receiver 12, to report error conditions and to accomplish a variety of other control tasks.

Figure 3:
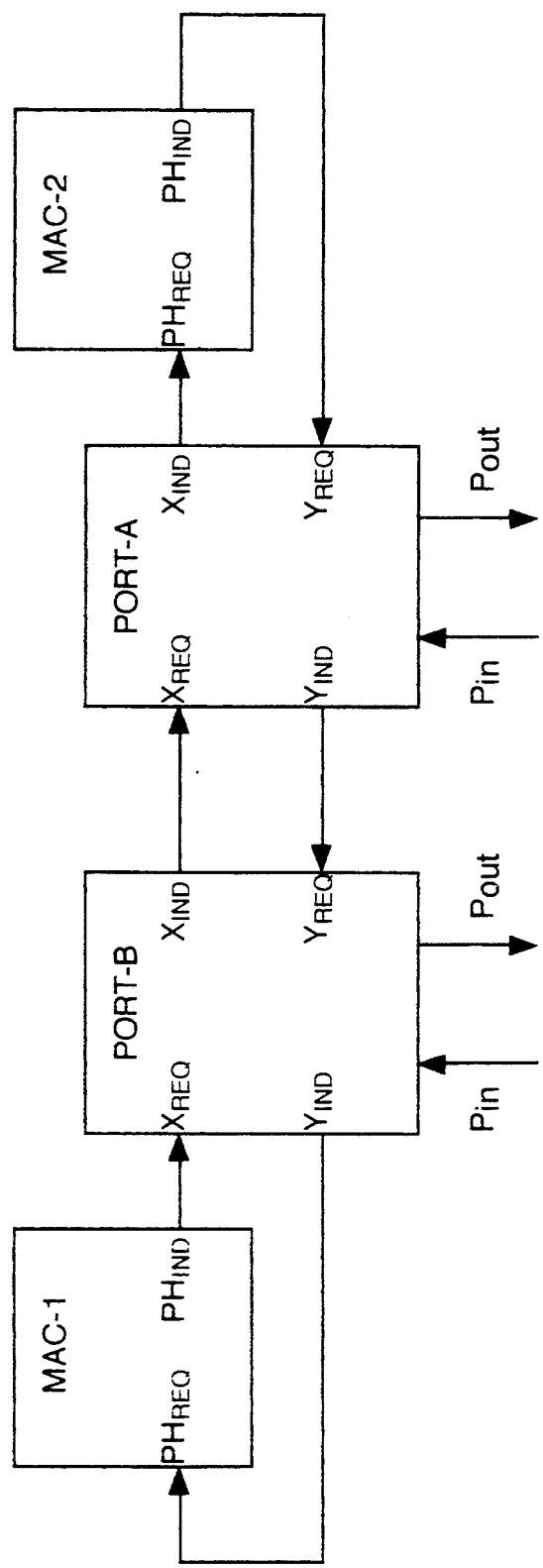
FIG. 3 is a block diagram of dual attachment station having a pair of MACs.

Referring next to FIG. 3, the functional configuration of a dual attachment station having a pair of MACs will be described. The dual attachment station includes two physical layers (PHYs), referred to as PHY-A and PHY-B herein. Each PHY includes a port that has both a physical input line ($P_{in}$) and a physical output line ($P_{out}$) which connect the station to the ports of neighboring nodes. Each PHY also has internal channel connections X, Y and Z. Each channel connection includes both an input (request) and an output (indicate). By way of example, the X channel connections are referred to as $X_{IND}$ (output) and $X_{REQ}$ (input).

The layout shown in FIG. 3 may not appear to be a conventional layout to those familiar with FDDI, however, it will be seen that the described configuration fully supports the FDDI standard. The physical connections between the PHYs and MACs is shown. Thus, $X_{IND}$ in PHY-A is connected to the input (labeled $PH_{REQ}$ in the drawings) of the second MAC (MAC-2). The output of MAC-2 (labeled $PH_{IND}$) is connected to $Y_{REQ}$ in PHY-A. $Y_{IND}$ in PHY-A is then connected to $Y_{REQ}$ in PHY_B and $Y_{IND}$ in PHY_B is connected to the input $PH_{REQ}$ of the first MAC (MAC-1). The output of MAC-1 ($PH_{IND}$) is coupled in turn to $X_{REQ}$ of PHY_B. Finally, $X_{IND}$ in PHY-B is connected to $X_{REQ}$ in PHY-A, thereby completing a first path. The channel Z can then be used to support alternative MAC and PHY connections. As will be apparent to those skilled in the art after some study, this arrangement can fully support any FDDI configuration, as well as several non-standard configurations merely by controlling the configurations of the PHY's channel connections.

Figure 4:
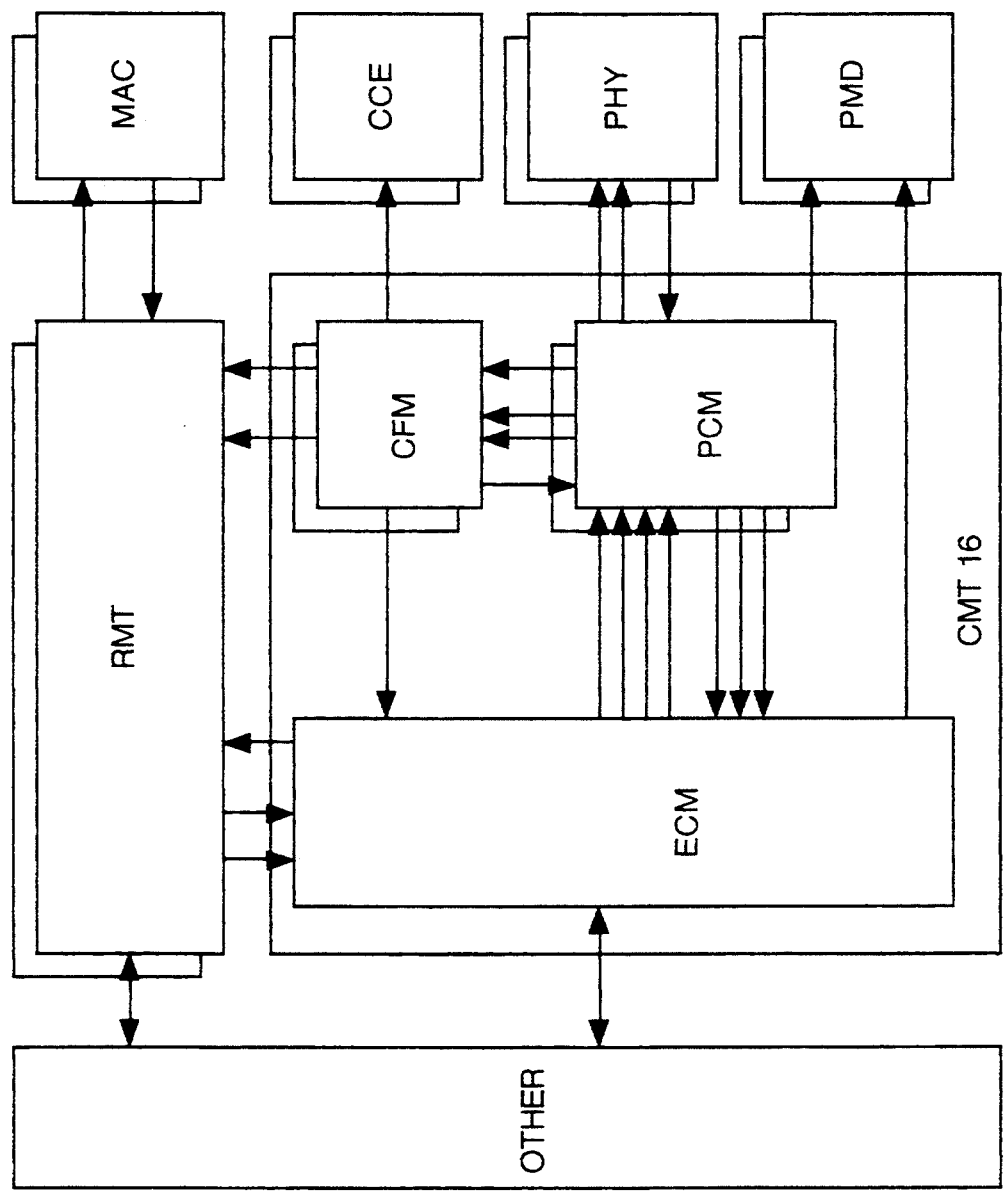
FIG. 4 is a block diagram of the Connection Management Structure within the Physical Layer Controller.

Referring next to FIG. 4, the Connection Management entity (CMT) 16 will be briefly described. In accordance with the FDDI protocol, the CMT 16 includes an Entity Coordination Management entity (ECM), a plurality of Physical Connection Management entities (PCM) and a plurality of Configuration Management entities (CFM). Within the FDDI protocol, one PCM is provided for each port, while one CFM is provided for each resource (i.e. each port or MAC). As indicated above, the PCM issues CF_Loop and CF_Join flags to CFM. In this embodiment, the CF_Loop flag 85 and the CF_Join flag 87 are reported in a PCM Status register 49 which will be explained in more detail below.

The Connection Management entity 16 communicates with a variety of other entities within the station, including the Ring Management (RMT), the Configuration Control Element (CCE), the Physical Layer (PHY), the Physical Medium Dependent layer (PMD) and others. A more detailed explanation of the interrelationship of these entities is set forth in the previously cited ANSI FDDI Station Management Standard. However, for the sake of simplicity, the relationships that are not particularly relevant to the present invention, will not be described in detail herein.

A number of data registers 17 are provided to facilitate the control and operation of the Physical Layer Controller 10. Each data register 17 includes 8 or 16 bits that store information about the system. Most of the registers are not directly related to the operation of the CFM and some of the registers relating to the CFM are not directly relevant to the present invention. Further, the actual significance of the contents of the registers may vary a great deal depending upon the desired features of the Physical Layer. Therefore, only the registers (and segments thereof) that are relevant to the present invention will be described herein.

The data registers 17 include a Control register 30, a CFM Status register 32, a Condition register 34, a Condition Mask register 36, a pair of Null Configuration registers 41, a pair of Join Configuration registers 43, a pair of Loop Configuration registers 45, a pair of Current Configuration registers 47 and a PCM Status register 49.

Figure 5:
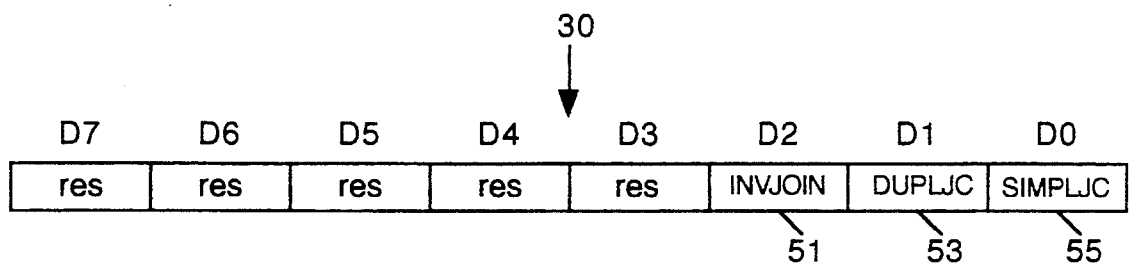
FIG. 5 is a diagram illustrating the contents of the Control Register.

Turning next to FIGS. 5–11, the content and function of the various registers will be described. The Control register 30 is a read/write register that can always be read or written into by the user. Thus, the state of each of the bits in the Control register can be set by the user. As seen in FIG. 5, the Control register 30 includes an invalidate join configuration bit 51, a duplex join configuration bit 53 and a simplex join configuration bit 55. In the described embodiment, these bits are located at positions D2, D1 and D0 respectively. The remaining bits D3–D7 are reserved (res) for other purposes.

The invalidate join configuration bit 51 gives the user the ability to select whether the values in the Join Configuration registers 43 can be used more than once to initiate a particular node configuration. Specifically, when the invalidate join configuration bit 51 is set, the contents of the Join Configuration registers 43 can only be used once. The invalidate join configuration bit then disables the reuse of the join configuration after a first CF_Join flag has been transmitted. When the invalidate join configuration bit 51 is not set, the values in the Join Configuration registers 43 can be reused without requiring user intervention. This feature permits the user to take additional actions between two assertions of the CF_Join flag. This feature is particularly helpful in cases where the CF_Join flag is deasserted and reasserted too fast for the associated application software to gain access.

The duplex join configuration bit 53 is used to indicate whether or not the Join Configuration registers 43 hold information that can be used during a duplex connection. Specifically, when the duplex join configuration bit 53 is set, the values in the Join Configuration register 43 represent a configuration that can be used in the Join configuration during the establishment of a duplex connection. On the other hand, when the duplex join configuration bit 53 is clear (not set), an interrupt will be generated if the PCM requests a duplex connection and a CF_Join flag is asserted. In this case, the contents of the Join Configuration register will not be used until the duplex join configuration bit 53 is actually set. This would typically be done after reloading the Join Configuration registers 43 with values representative of a desired duplex configuration. When the duplex join configuration bit 53 is cleared while the join configuration is being used for a current duplex connection, the CFM will revert from the Join configuration back to the Null configuration. The CFM can determine the type of connection that the PCM is attempting to establish by reading the connection mode indicator 89 in PCM Status register 49.

The simplex join configuration bit 55 functions similarly to duplex join configuration bit 53. Thus, it is used to indicate whether or not the Join Configuration registers 43 hold information that can be used during a simplex connection. Accordingly, when the simplex join configuration bit 55 is set, the values in the Join Configuration register 43 represent a configuration that can be used in the Join configuration during the establishment of a simplex connection. On the other hand, when the simplex join configuration bit is clear (not set), an interrupt will be generated anytime that the PCM requests a simplex connection when a CF_Join flag is asserted. At such times, the contents of the Join Configuration register 43 will not be used until the simplex join configuration bit 55 is actually set. This would typically be done after reloading the Join Configuration registers 43 with values representative of a desired simplex configuration. When the simplex join configuration bit 55 is cleared while the join configuration is being used for a current simplex connection, the CFM state machine will revert from the Join configuration back to the Null configuration.

Figure 6:
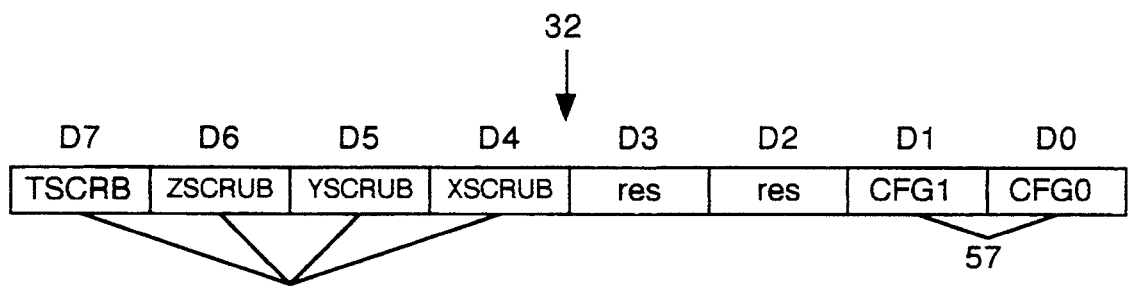
FIG. 6 is a diagram illustrating the contents of the Status Register.

Turning next to FIG. 6, the CFM Status register 32 will be described. The CFM Status register 32 is a read always register that provides general information about the current CFM configuration and the scrubbing flags. Bits D1 and D0 of the CFM Status register 32 form a configuration indicator 57 that indicates the current CFM configuration. Each potential CFM configuration has a corresponding value within the configuration indicator 57 (labeled CFG in the drawing) that will be set when the CFM enters the associated configuration. Thus, the user can always check the current configuration of the CFM. As indicated above, there are three potential CFM configurations. That is, the null configuration which is represented by the value (0,0), the join configuration which is represented by the value (0,1), and the loop configuration which is represented by the value (1,0). The value (1,1) is reserved and has no meaning in the described embodiment.

Bits D2 and D3 in the CFM Status register 32 are reserved and have no special meaning. Bits D4–D7 relate to scrubbing. Specifically, Bit D4 is a flag (labeled XSCRUB in the drawing) that is set when scrubbing is being performed on the output of channel X. Bit D5 is a flag (labeled YSCRUB in the drawing) that is set when scrubbing is being performed on the output of channel Y. Bit D6 is a flag (labeled ZSCRUB in the drawing) that is set when scrubbing is being performed on the output of channel Z. And finally, bit D7 is a flag (labeled TSCRB in the drawing) that is set when scrubbing is being performed on the transmitter 14.

Figure 7:
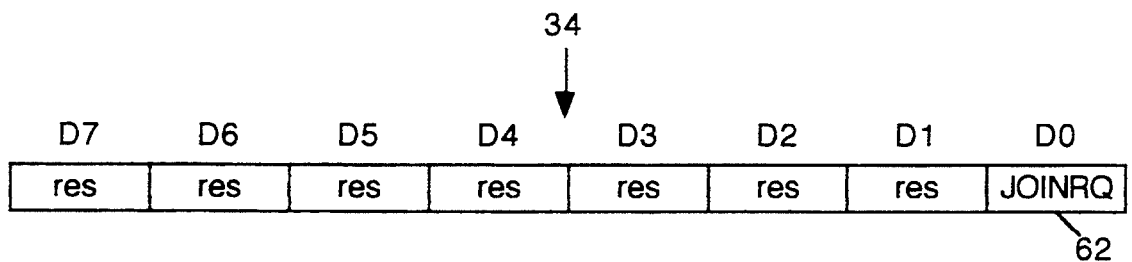
FIG. 7 is a diagram illustrating the contents of the Condition Register.

Referring next to FIG. 7, the Condition register 34 will be described. Bits in the Condition register 34 are flags that can always be read or written into by the user. The flags within the Condition register 34 are designed to indicate the reason(s) that caused a particular CFM event. Thus, the user is free to poll the bits within the Condition register at any time to determine the cause of certain events that have transpired. Bit D0 of the Condition register 27 is a join request flag 62, (labeled JOINRQ in the drawing). The remaining bits in the Condition register 34 are reserved to act as other flags.

The join request flag 62 is set any time that the current value in the Join Configuration register 43 can not be used in the Join configuration. This may be due to a connection type incompatibility or it may be the result of a request for invalidation that follows use. The former case occurs when the PCM requests a duplex connection when the duplex join configuration bit 53 is not set, or a simplex connection when the simplex join configuration bit 55 is not set. A request for invalidation occurs when the invalidate join configuration bit 51 is set and reuse of the join configuration register is attempted. When the join request flag 62 is set, the CFM state machine will remain in the Null configuration until the join configuration is validated. The contents of the Join Configuration register 43 can be validated by setting the appropriate selection bits in Control register 30. Alternatively, when join request flag 62 is set due to a request for invalidation that follows use, the contents can be validated by reloading the Join Configuration registers 43.

Figure 8:
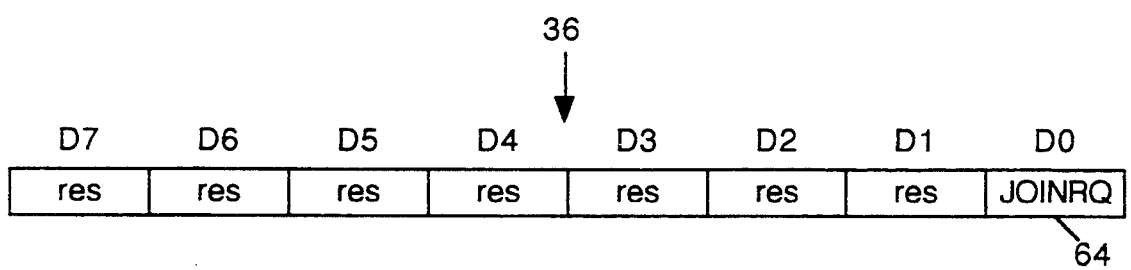
FIG. 8 is a diagram illustrating the contents of the Condition Mask Register.

The Condition Mask register 36 shown in FIG. 8 is closely related to the Condition register 34. Specifically, each bit in the Condition Mask register 36 has a corresponding bit in the Condition register 34. Thus, the Condition Mask register 36 includes a join request mask 64. The Condition Mask register 36 is intended to facilitate the generation of interrupts. In operation, bits that are masked "off" (i.e. zeros) will not generate an interrupt, regardless of whether their corresponding bit in the Condition register 34 is set. On the other hand, bits that are masked "on" (i.e. ones) will generate an interrupt anytime their corresponding bit in the Condition register 34 is set.

The user has complete freedom to read and write into the Condition Mask register 36. In this way, the user can decide which conditions they wish to be informed of. Thus, when the join request mask 64 is set to zero, the user will not be informed when bit 62 in the Condition register 34 is set. On the other hand, if the join request mask 64 is set to one, an interrupt will be generated anytime the bit 62 in the Condition register 34 is set. The user can then define the specific actions that are desired in response to this condition. Of course such actions would typically be handled by application software.

Figure 9:
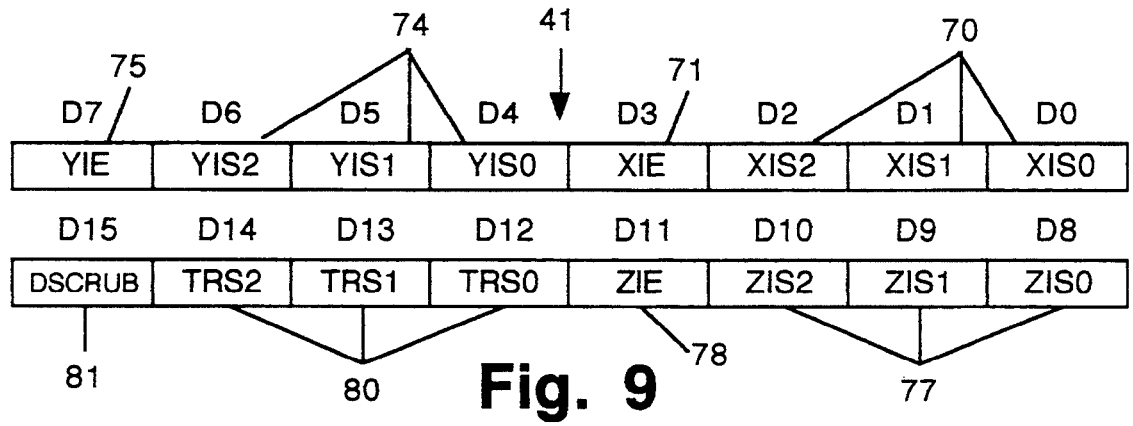
FIG. 9 is a diagram illustrating the contents of the Null Configuration Registers.
Figure 10:
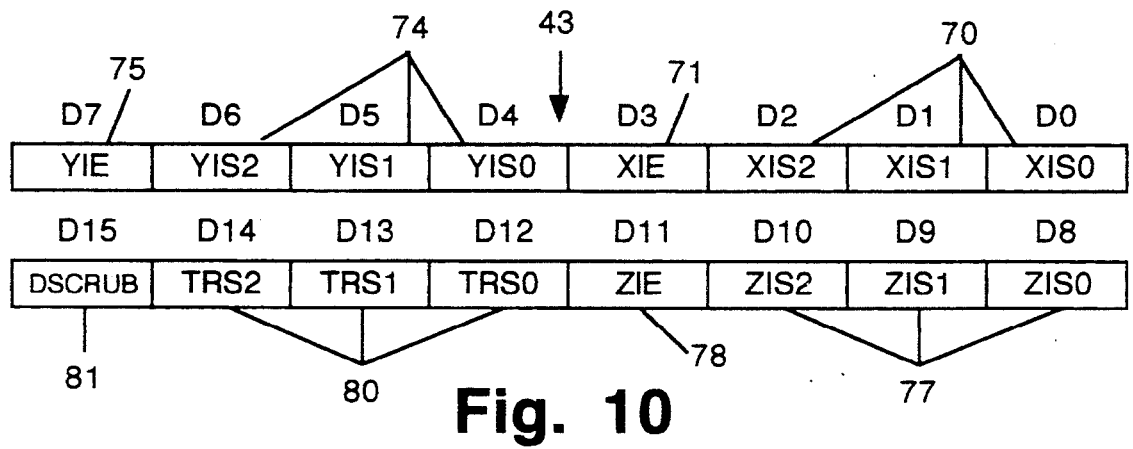
FIG. 10 is a diagram illustrating the contents of the Join Configuration Registers.
Figure 11:
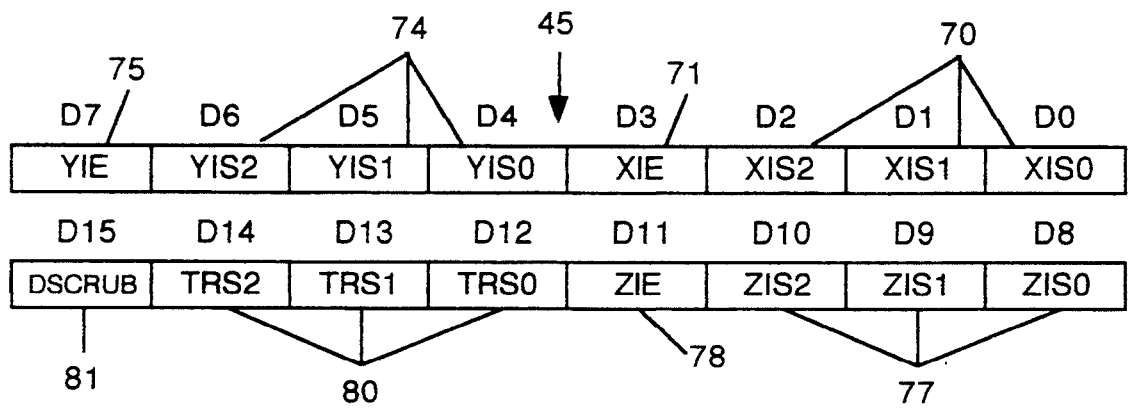
FIG. 11 is a diagram illustrating the contents of the Loop Configuration Registers.

Turning next to FIG. 9, the Null Configuration registers 41 will be described. The Null Configuration registers specify the values to be loaded into the Current Configuration registers 47 when the CFM state machine is in the Null configuration. That is, when neither a CF_Join nor a CF_Loop flag is being asserted. As seen in FIG. 9, two eight bit registers constitute the Null Configurations registers in the described embodiment.

Bits D0–D2 within the Null Configuration registers form a three bit X channel selector 70 that is used to select the configuration switch data bus that is to be connected to the output ($X_{IND}$) of channel X. In the described embodiment, there are five configuration switch data buses and each has a corresponding value that can be stored with in the X channel selector. They include the PHY invalid bus (represented by the value (0,0,0)), the Receiver bus (0,0,1), the X_Request bus (0,1,0), the Y_Request bus (0,1,1) and the Z_Request bus (1,0,0). The remaining possible values are reserved for other purposes. The PHY invalid bus is a source of invalid symbols. The PHY Receiver bus connects $X_{IND}$ to $P_{in}$. The X_Request bus connects $X_{IND}$ to the input $X_{REQ}$ of channel X. The Y_Request bus connects $X_{IND}$ to the input $Y_{REQ}$ of channel Y. The Z_Request bus connects $X_{IND}$ to the input $Z_{REQ}$ of channel Z. Thus, the X channel output can be connected to any of the physical layer controller's inputs.

Bit D3 within the Null Configuration registers is used to enable or disable the output channel X. Specifically, when the X port enable bit 71 is set to a high level, output channel X is enabled. On the other hand, when the X channel enable bit 71 is cleared to a low level (i.e. a logical "zero"), output channel X is disabled.

Bits D4-D6 within the Null Configuration registers form a three bit Y channel selector 74 that functions identically to the X channel selector 70 except that it controls the connection of the output channel Y to the various configuration switch data buses. Similarly, Bit D7 is the Y channel enable bit 75, which functions similarly to the X channel enable bit 71. Bits D8-D11 have a similar function for the Z output channel. That is, Bits D8-D10 form a Z channel selector 77 and Bit D11 is a Z channel enable bit 78.

Bits D12-D14 form a transmit request selector that connects one of the configuration switch data buses to the input of the transmitter block 14. Finally, Bit D15 is a disable scrubbing flag 81 (labeled DSCRUB in the drawings). When the disable scrubbing flag 81 is set, it prohibits scrubbing on all channels when the CFM state machine enters the Null configuration (The null configuration register contents are loaded into the current configuration registers).

The contents of the Join Configuration registers 43 (FIG. 10) and the Loop Configuration registers 45 (FIG. 11) are identical to the Null Configuration registers 41. The only difference is that the Join Configurations registers 43 store values indicative of the desired configurations when the CFM state machine is in the Join configuration. Similarly, the Loop configuration registers 45 store values indicative of the desired configurations when the CFM state machine is in the Loop configuration. The Join Configuration registers 43 contain the configuration to be loaded into the Current Configuration registers 47 when a CF_Join flag is provided and there are not any blocking conditions. Similarly, the Loop Configuration registers 45 contain the configuration to be loaded into the Current Configuration registers 47 when a CF_Loop flag is provided and there are not any blocking conditions.

Figure 13:
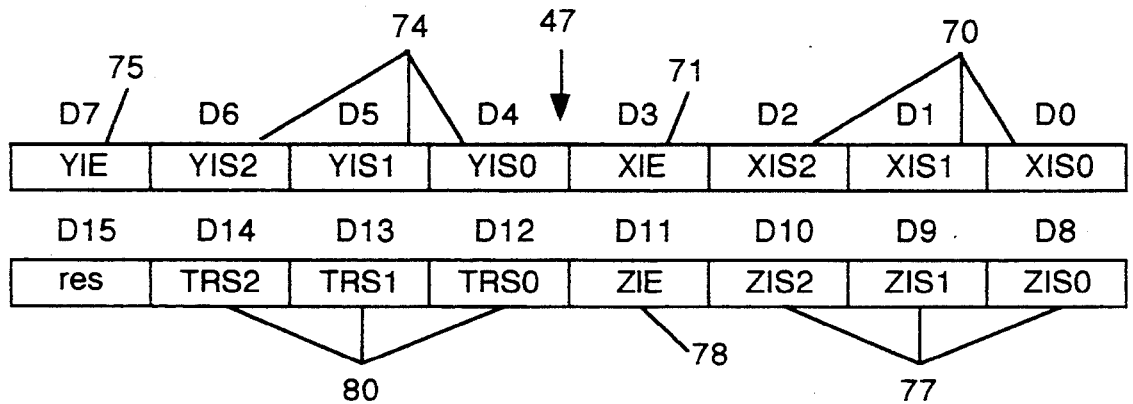
FIG. 13 is a diagram illustrating the contents of the Current Configuration Registers.

Referring next to FIG. 13, it can be seen that the contents of the Current Configuration register 47 are virtually identical to the contents of the Null, Join, and Loop Configuration registers 41, 43 and 45. The only difference in the bit contents is that bit D15 is reserved (res) and has no function. The Current Configuration register 47 is an internal register that can not be directly written into by the user. Its contents dictate the actual internal configuration of the various port and channel inputs and outputs within the associated physical layer controller.

With the described arrangement of the configuration registers, each of the outputs of the Physical layer controller can be internally connected to any of the controller's inputs merely by writing the desired input into the appropriate channel selector. Additionally, should it ever be desired, more than one of the controller's outputs can be connected to a single input.

Figure 12:
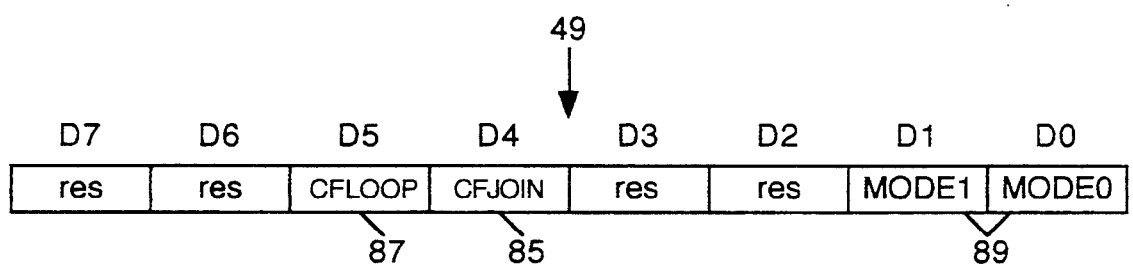
FIG. 12 is a diagram illustrating the contents of the PCM Status Register.

Referring next to FIG. 12, the contents of the PCM Status register 49 will be described. The PCM Status register 49 is a read always register that provides PCM generated flags and general information about the PCM. Bits D0 and D1 of the PCM Status register 49 form a connection mode indicator 89 (labeled MODE in the drawings) that indicates the type of connection that the PCM wishes to make. Specifically, no connection is represented by the value (0,0) in the connection mode indicator 89. A simplex connection is represented by the value (0,1). A duplex connection is represented by the value (1,0) and value (1,1) is reserved and has no meaning.

Bits D2, D3, D6, and D7 are reserved. Bits D4 and D5 are the CF_Join flag 85 (labeled CFJOIN in the drawing) and the CF_Loop flag 87 (labeled CFLOOP in the drawing) respectively. As indicated above, the CF_Join flag 85 is raised when the PCM wants the CFM to enter the Join configuration so that the port can become an active member of the data transmission ring. Similarly, the CF_Loop flag 87 is raised when the PCM wishes to conduct a loop test during the connection management sequence.

In the described embodiment, there are effectively three permissible CFM configuration states. They are the Null configuration state, the Join configuration state and the Loop configuration state. The Join configuration state dictates the configuration of the ports and MACs within the node when the node is an active participant in the rings activity. The Join state will only exist when the PCM's CF_Join flag is set and there are no other blocking conditions. The Loop Configuration state dictates the configuration of the ports and MACs within the node during the execution of a loop test. The Loop configuration state will only exist when the PCM's CF_Loop flag is set and there are no other blocking conditions. The Null configuration state dictates the configuration of the Ports and MACs at any time that the node is not in active communication with its neighbors. Typically this will be when neither the CF_Join nor the CF_Loop flag is asserted. However, the CFM will remain in the Null configuration when a blocking condition exists while one of these flags is asserted.

Each effective CFM configuration state has a corresponding configuration register. That is, the Null Configuration register 41, the Join Configuration register 43 and the Loop Configuration register 45. As will be appreciated by those skilled in the art the use of just these three registers will, in almost all cases, permit the physical layer controller 10 to execute the entire CFM function without any software intervention during operation of the node, even during the connection management sequence. This gives the physical layer controller the ability to make very fast connections, particularly when it is combined with the features of co-pending application Ser. Nos. 07/988,246 filed Dec. 9, 1992 and Ser. No. 07/988,245 filed Dec. 9, 1992 which are assigned to the assignee of the present application and which are incorporated herein by reference. The cited applications describe a method and apparatus for accomplishing the physical connection management (PCM) function in a hardware based system.

By way of example, it will typically be desirable to maintain the CFM state machine in an isolated path configuration while the PCM conducts the line state signalling necessary during the connection management sequence. However, during the portion of the connection management sequence that a loop test is being conducted (for example, during a Link Confidence test) it will typically be desirable for the CFM state machine to enter a local path configuration. Finally, when the node joins the network as an active member of the data transmission ring, the CFM state machine will enter a suitable join path configuration. This could be a thru path configuration, a concatenated path configuration, a wrap path configuration or a unique (i.e., non-standard) path configuration dictated by a particular design requirement.

By providing the described three configuration registers 41, 43 and 45, the user can program the desired configurations during these effective CFM Null, Join and Loop states, prior to the initiation of the Connection Management sequence. Accordingly, when the connection management sequence is initiated, the configuration changes can be made very quickly, and without requiring software intervention. It is significant to note that it is unnecessary to provide more than three such Configuration registers (although of course more Configuration registers could be provided). The reason in that each of the described Configuration registers is programmable by the user so that regardless of the desired CFM path configuration when the CFM is in a particular configuration state, that path configuration can be achieved merely by loading the appropriate values into the associated Configuration register.

It is noted that in the event of a line fault when the physical layer controller is an active member of the data transmission ring, user (software) intervention will not be required in the vast majority of cases. The reason is that when a fault occurs, the PCM will withdraw the CF_Join flag. At that point, the Null state configuration (i.e., the values in Null Configuration registers 41) will be automatically loaded into the Current Configuration registers 47. Then when the fault is corrected or routed around, the CF_Join flag is reasserted and assuming there are no blocking conditions, the desired Join state configuration (i.e., the values in Join Configuration registers 43) will be automatically loaded back into the Current Configuration registers 47. If for any reason the user desires to change the join state path configuration after a line fault, that can be accomplished as well by setting the invalidate join configuration bit 51.

Although only one embodiment of the present invention has been described, it should be understood that the present invention may be embodied in many other specific forms without departing from the spirit or scope of the invention. Particularly, the described invention is applicable to all FDDI nodes, whether they be stations or concentrators, single attachment nodes or dual attachment nodes. In the claims the word station is frequently used, however, it should be appreciated that as used in the claims this term is intended to encompass both formal FDDI "stations" and concentrators. Further, the utility of the invention is not limited to networks that operate in strict compliance with the FDDI standard. Rather it can be applied to a variety of networks although it is expected that its greatest usefulness will be in high speed networks that operate substantially in compliance with the FDDI standards. Therefore, the present examples are to be considered as illustrative and not restrictive, and the invention is not to be limited to the details given herein, but may be modified within the scope of the appended claims.

What is claimed is:

1. A physical layer controller for controlling the physical layer of a station that is suitable for insertion into a data transmission network that operates substantially in accordance with the Fiber Distributed Data Interface (FDDI) protocol, the physical layer controller including a configuration management entity that includes a configuration management state machine for configuring the physical layer controller substantially in compliance with the FDDI protocol, the physical layer controller further comprising:

a plurality of registers, the registers including a null configuration register for storing information indicative of a desired configuration of the physical layer controller when the configuration management state machine is in a null configuration, a join configuration register for storing information indicative of a desired configuration when the configuration management state machine is in a join configuration and a loop configuration register for storing information indicative of a desired configuration when the configuration management state machine is in a loop configuration, the null, loop and join configuration registers each being arranged to independently load information into the configuration management state machine when the configuration management state machine is to be transitioned to a state associated with that particular register such that the physical layer controller can conduct a connection management sequence that requires the configuration management state machine to enter a plurality of states without requiring software intervention to write in a new configuration during the execution of the connection management sequence.

2. A physical layer controller as recited in claim 1 wherein the null, join, and loop configuration registers are each read/write registers that may be read and written into by a user in order to set the configuration to be used when the configuration management state machine enters the configuration associated with that configuration register.

3. A physical layer controller as recited in claim 2 wherein the plurality of registers further includes a current configuration register that dictates the configuration of the physical layer controller at all times, the current configuration being arranged to receive:

at least a portion of the contents of the null configuration register when the configuration management state machine is in the null configuration;

at least a portion of the contents of the join configuration register when the configuration management state machine is in the join configuration; and at least a portion of the contents of the loop configuration register when the configuration management state machine is in the loop configuration.

4. A physical layer controller as recited in claim 2 further comprising:

a port capable of receiving a pair of connectors for coupling the physical layer controller to an adjacent node in the data transmission network, the port having a port input and a port output;

at least one channel connection for coupling the physical layer controller to a neighboring controller within the station, the channel connection having a channel input and a channel output; and wherein each of the configuration registers includes a first channel selector that indicates the physical layer controller input to which the channel output is to be connected when the configuration management state machine enters the configuration associated with that configuration register.

5. A physical layer controller as recited in claim 4 further comprising:
a plurality of channel connections; and
wherein each configuration register further includes a plurality of channel selectors, each channel selector being arranged to indicate the physical layer controller input to which the associated channel output is to be connected to when the configuration management state machine enters the configuration associated with that configuration register.

6. A physical layer controller as recited in claim 4 further comprising:
a transmitter having a transmitter output coupled to the port output and a transmitter input; and
wherein each configuration register further includes a transmitter selector arranged to indicate the physical layer controller input to which the transmitter input is to be connected to when the configuration management state machine enters the configuration associated with that configuration register.

7. A physical layer controller as recited in claim 4 wherein each configuration register further includes a programmable channel enable bit that is arranged to enable the channel output when set to a first level and to disable the channel output when set to a second level.

8. A physical layer controller as recited in claim 1 wherein the plurality of registers further includes a control register that the user may selectively read and write into, the control register including a permissible connection indicator that the user may program to indicate whether the join configuration register contains values suitable to support at least one of a desired duplex or a desired simplex connection.

9. A physical layer controller as recited in claim 8 further comprising:
a physical connection management entity that includes a physical connection management state machine and is capable of executing a connection management sequence substantially in accordance with the FDDI protocol, the physical connection management entity transmitting a configuration join flag to the configuration management entity when the physical connection management state machine wishes the configuration management entity to enter a join configuration; and wherein
the plurality of registers further includes a physical connection management status register that includes a connection mode indicator that indicates the type of connection that the physical connection management entity wishes to make;
wherein when the connection management entity raises the configuration join flag, the configuration management entity will only enter the join configuration if the permissible connection indicator indicates that the desired connection type indicated by the connection mode indicator is supported by the values currently in the join configuration register.

10. A physical layer controller as recited in claim 9 wherein the permissible connection indicator includes a first bit that indicates whether the values in the join configuration register are suitable to support a desired duplex configuration and a second bit that indicates whether the values in the join configuration register are suitable to support a desired simplex configuration.

11. A physical layer controller as recited in claim 1 wherein the plurality of registers further includes a control register that the user may selectively read and write into, the control register including an invalidate join configuration bit that can be programmed by the user, wherein when the join configuration bit is set to a first level, the values in the join configuration register can be used repeatedly and wherein when the invalidate join configuration bit is set to a second level, the values in the join configuration register can only be used once, whereby if the connection management entity is asked to establish a join configuration after the values in the join configuration register have been used to establish a previous connection, then the join configuration will be withheld.

12. A physical layer controller as recited in claim 3 wherein the current configuration register is arranged such that it can only be loaded from the null configuration register, the join configuration register, the loop configuration register and external software.

13. A physical layer controller as recited in claim 1 wherein the use of the null configuration register, the join configuration register and the loop configuration register permits all configuration management configurations required for any standard FDDI connection to be accomplished without the use of software intervention.

14. A physical layer controller for controlling the physical layer of a station that is suitable for insertion into a data transmission network, the physical layer controller including a configuration management entity that includes a configuration management state machine and is arranged to configure the physical layer controller, the physical layer controller further comprising:
a plurality of configuration storing registers each arranged to store information indicative of a desired configuration of the physical layer controller when the configuration management state machine enters a predefined state associated with that particular configuration storing register, the configuration storing registers each being arranged to be preloaded with configuration information indicative of an independent predetermined state and independently load such information into the configuration management state machine when the configuration management state machine is to be transitioned to a state associated with that particular register such that the physical layer controller can conduct a connection management sequence that requires the configuration management state machine to enter a plurality of states without requiring software intervention to write in a new configuration during the execution of the connection management sequence.

15. A physical layer controller for controlling the physical layer of a station that is suitable for insertion into a data transmission network that is capable of operating substantially in accordance with the fiber distributed data interface (FDDI) protocol, the physical layer controller including a configuration management entity that includes a configuration management state machine and is arranged to configure the physical layer controller substantially in compliance with the FDDI protocol, the physical layer controller further comprising:

a current configuration register that dictates the configuration of the physical layer controller;

a plurality of configuration data holding registers each arranged to store information indicative of a desired configuration of the physical layer controller when the configuration management state machine enters a predefined state associated with the configuration holding register, wherein each configuration data holding registers is arranged to be preloaded with configuration information indicative of an independent predetermined state and transmit at least a portion of its contents to the current configuration register when the configuration management state machine enters a state associated with that configuration data holding register, the configuration data holding registers each being arranged to independently load information into the current configuration register when the configuration management state machine is to be transitioned to a state associated with that particular register such that the physical layer controller can conduct a connection management sequence that requires the configuration management state machine to enter a plurality of states without requiring software intervention to write in a new configuration during the execution of the connection management sequence.

16. A physical layer controller as recited in claim 15 further comprising:

a port for receiving a pair of connectors for coupling the physical layer controller to an adjacent node in the data transmission network, the port having a port input and a port output;

a plurality of channel connections for coupling the physical layer controller to a neighboring controller within the station, each channel connection having a channel input and a channel output;

a transmitter having a transmitter output coupled to the port output and a transmitter input; and the current configuration register and each of the configuration data holding registers includes a plurality of channel selectors and a transmitter selector, wherein each channel selector is associated with a particular channel output and arranged to indicate the physical layer controller input to which the channel output is to be connected to in a particular state, and the transmitter selector is arranged to indicate the physical layer controller input to which the transmitter input is to be connected to in the particular state.

17. A physical layer controller for controlling the physical layer of a station that is suitable for insertion into a data transmission network that operates substantially in accordance with the FDDI protocol, the physical layer controller comprising:

a configuration management entity that includes a configuration management state machine that is capable of configuring the physical layer controller substantially in compliance with the FDDI protocol;

a port for receiving a pair of connectors for coupling the physical layer controller to an adjacent node in the data transmission network, the port having a port input and a port output;

a plurality of channel connections for coupling the physical layer controller to a neighboring controller within the station, each channel connection having a channel input and a channel output;

a transmitter having a transmitter output coupled to the port output and a transmitter input;

a current configuration register that dictates the configuration of the physical layer controller;

a read/write null configuration register for storing information indicative of a desired configuration of the physical layer controller when the configuration management state machine enters a null configuration;

a read/write join configuration register for storing information indicative of a desired configuration when the configuration management state machine enters a join configuration; and a read/write loop configuration register capable for storing information indicative of a desired configuration when the configuration management state machine enters a loop configuration;

wherein the null, join, and loop configuration registers are each arranged to transmit at least a portion of its contents to the current configuration register when the configuration management state machine enters a state associated with that configuration register.

18. A physical layer controller as recited in claim 17 wherein each configuration register further includes:

a plurality of channel selectors, each channel selector being arranged to indicate the physical layer controller input to which an associated channel output is to be connected to when the configuration management state machine enters the configuration associated with that configuration register;

a transmitter selector arranged to indicate the physical layer controller input to which the transmitter input is to be connected to when the configuration management state machine enters the configuration associated with that configuration register; and a programmable channel enable bit that is arranged to enable the channel output when set to a first level and to disable the channel output when set to a second level.

19. A physical layer controller as recited in claim 17 further comprising:

a control register that the user may selectively read and write into, the control register including a permissible connection indicator that the user may be programmed to indicate whether the join configuration register contains values suitable to support at least one of a desired duplex or a desired simplex connection.

* * * * *